Dec. 17, 1957 F. J. LUKETA 2,816,385
TRAWL DOORS AND TOWING BRIDLES THEREFOR
Filed Oct. 10, 1955 2 Sheets-Sheet 1
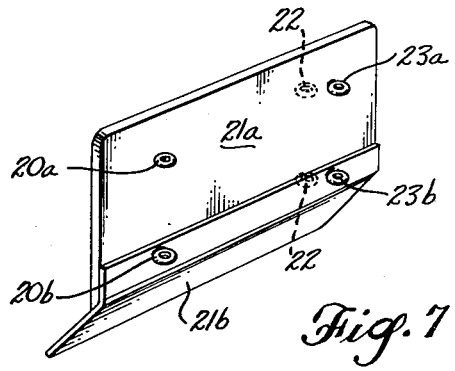
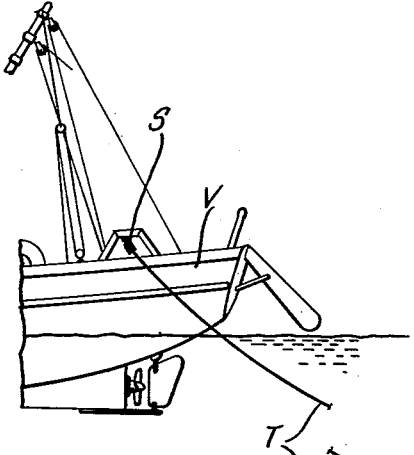
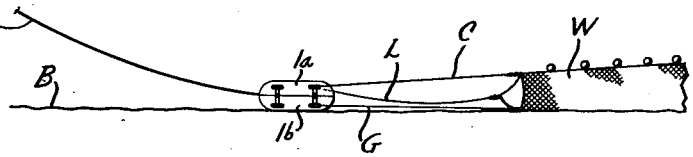
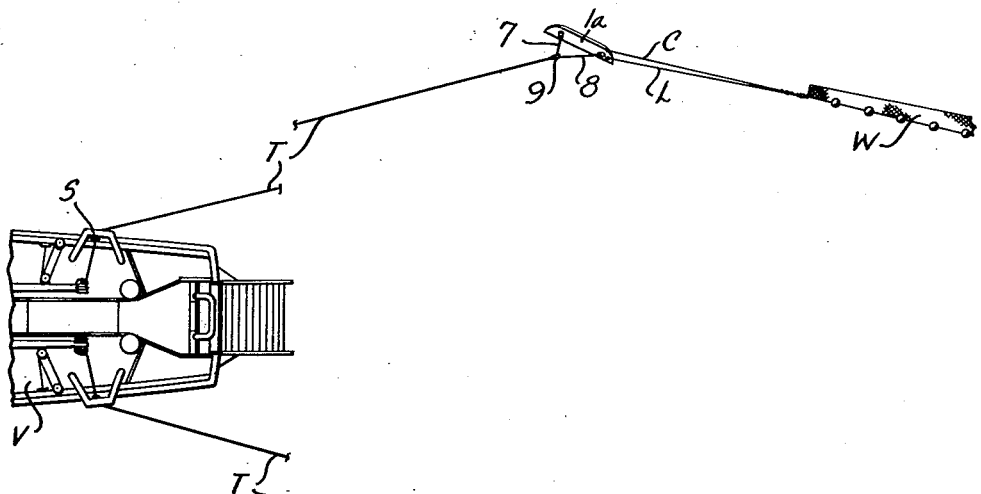
INVENTOR.
FRANK J. LUKETA
BY
Reynolds, Beach & Christensen
ATTORNEYS Dec. 17, 1957  F. J. LUKETA  2,816,385
TRAWL DOORS AND TOWING BRIDLES THEREFOR
Filed Oct. 10, 1955  2 Sheets-Sheet 2
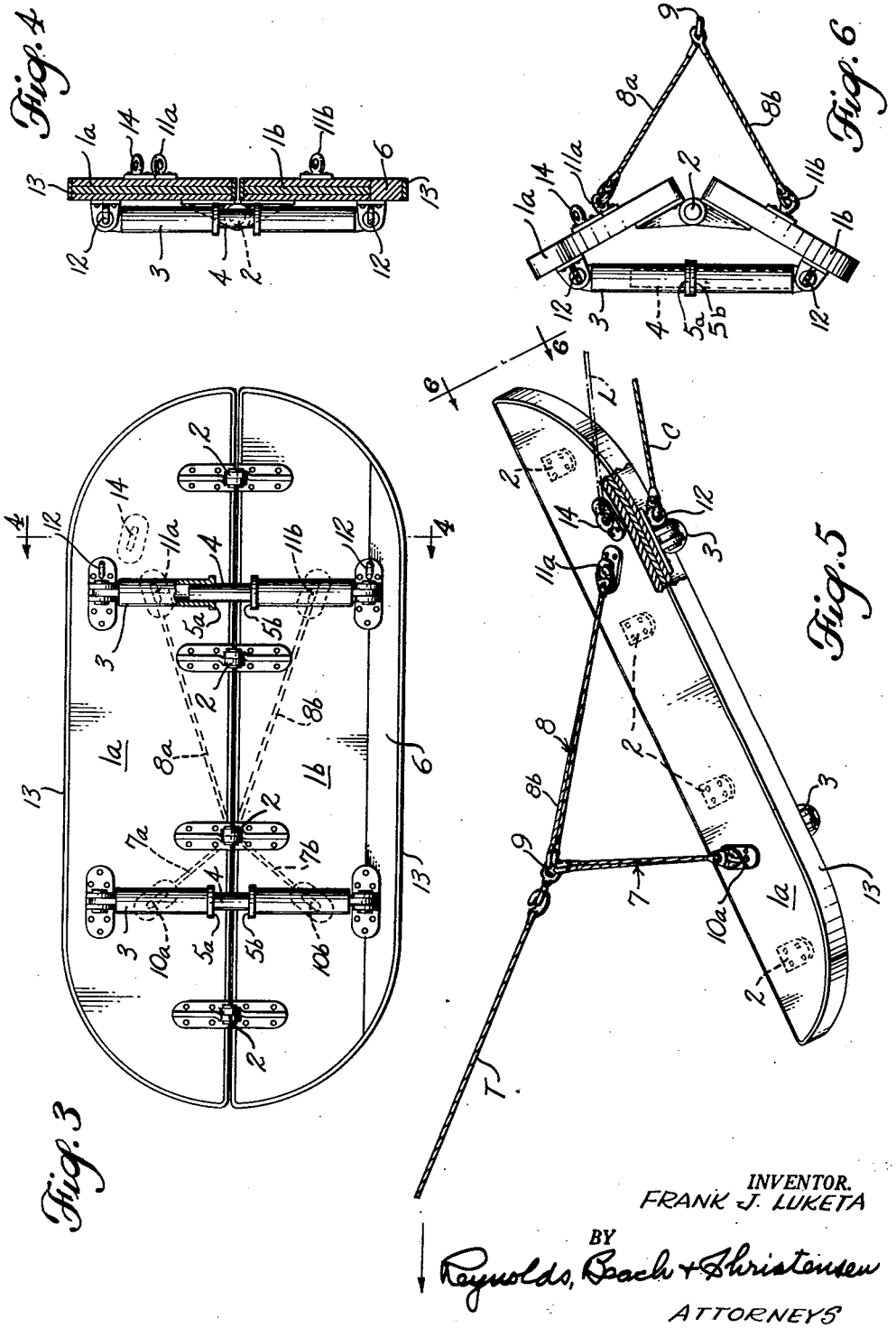
INVENTOR.
FRANK J. LUKETA
BY
Reynolds, Beach + Christensen
ATTORNEYS

United States Patent Office 2,816,385
Patented Dec. 17, 1957

2,816,385
TRAWL DOORS AND TOWING BRIDLES THEREFOR

Frank J. Luketa, Seattle, Wash.

Application October 10, 1955, Serial No. 539,463

11 Claims. (Cl. 43—9)

A trawl net is dragged close to the bottom of the body of water wherein it is used. Its wings must spread widely in order to sweep an appreciable area behind the towing vessel. The more widely the wings spread the greater area the net will cover and the more likely it is to produce a good haul. Two vanes are commonly employed at the forward ends of the respective trawl lines leading to the opposite wings of the net, which are towed at the ends of long tow lines behind the vessel. These vanes are slanted relative to the direction of movement, and by their reaction to the water serve, when functioning properly, to spread the wings of the net apart. The vanes so used are ordinarily panels lying in a single plane, of large area and weight, heavily weighted at one longitudinal edge, and of a shape generally resembling a shipboard door, hence commonly called "doors."

The towing bridles which extend forwardly from the forward face of the slantingly positioned trawl door, and the trawl lines, the cork line and the ground line, which extend rearwardly from the after face of the same door, in theory have been so arranged that the door will, in use, remain in a substantially upright plane, but will ride along the bottom. In practice, it is not uncommon for such doors to ski over the water flatwise and refuse to position themselves by the water reaction in the intended upright plane, and sometimes a door will become inverted, and so instead of veering outboard, will cross over and become crossed with the opposite vane or door, at the forward end the opposite wing of the net. Any such occurrence fouls the gear and requires, at best, an appreciable amount of valuable time to untagle the gear and to let it out again, and may cause very appreciable damage to the net, towing gear, lines, and other equipment.

It is not uncommon to find that the doors will "mud in" as they drag along the bottom, to such an extent as even to halt the forward progress of the vessel. In such a situation, there is loss of valuable time, and considerable skill and great power are required to retrieve the embedded door. Sometimes a door will become so embedded that it can not be retrieved, and much gear is lost when it is broken loose. Not only is the immediate monetary loss appreciable, but the trawler is out of operation until it returns to port for another set of gear.

The broad principles of this invention are illustrated as embodied in two somewhat different styles of door. The main trawl net is of large size, and requires large doors, but it is customary to drag a try net of small size preliminarily to setting out the main net, in order to determine if fish are present in numbers such as will pay to use the main net, and to determine the varieties of such fish. The small try net is much more quickly and easily handled than the main net, and requires much smaller and lighter doors. Certain of the principles of this invention are incorporated in the try net door, as well as in the main door, but whereas the main door is desirably formed of two panels hingedly joined along a longitudinal line for limited hinging movement between a monoplanar disposition, wherein it is stowed aboard the vessel, and an angled position of use, the smaller try-net door may be of permanently angled shape, wherefore certain of the novel principles incorporated in the main door are not necessarily present in the try-net door, all as will appear more fully hereinafter.

It is a primary object of the present invention to provide a trawl door of such shape and held in such disposition, at least while in use, that it tends rather to skid or ride over the bottom than to dig into the same, and so will avoid the "mudding in" of such doors and the consequences thereof. Since the main net doors when not in use are normally supported flatwise against stanchions at the after bulwark, it is also an object to provide a trawl door which when not in use may be disposed in such a monoplanar disposition, but which in use, and solely by water reaction as related to certain leverages, will shift into an obtuse-angled shape, the better to cause it to veer outboard, and to ride over the bottom.

In such a door, and in particular but not exclusively one which is formed of two panels so hingedly connected and relatively movable, it is an object to provide a towing bridle and points of anchorage of the trawl lines so positioned and so related that the leverages of towing and towed lines, respectively, together with water reaction forces, will insure the relative movement of the parts into the proper obtuse-angled relationship, so that the door can not ski inboard, but will veer off outboard of the vessel's path, and will be tilted rearwardly to dispose its exterior angled face forwardly to the water reaction forces. It is also an object to provide means for limiting such angular movement of the panels into the obtuse-angled relationship referred to, so that by these means, and in particular by the relative locations of the points of anchorage of the several lines, as will be described more fully in detail hereinafter, the proper disposition and movement of the door is assured automatically by the relative leverages as affected by water reaction forces.

With such objects in mind, and others as will appear more fully hereinafter, the present invention comprises the novel trawl door shown in the accompanying drawings, and as will be described more fully hereinafter and defined in the claims, and likewise the combination with such a door of a towing bridle and of the trawl lines, likewise as shown in the drawings and as will be described and defined hereinafter.

Figure 1 is a general side elevational view of the stern of the trawling vessel and of the forward part of the wings, showing the connection of the doors intermediate the vessel and the wings.

Figure 2 is a plan view of the same parts.

It will be understood that the distances are so great that no attempt is made in Figures 1 and 2 to show to scale the relative dispositions of the parts illustrated.

Figure 3 is a side elevational view of the door illustrated in a preferred form of construction, and with the parts in coplanar relationship for storage.

Figure 4 is a cross-sectional view through the same, substantially at the line 4—4 of Figure 3.

Figure 5 is a plan view of the door with parts in the relative positions of use, and Figure 6 is an aft end elevational view of the same, substantially as illustrated at 6—6 in Figure 5.

Figure 7 is an isometric view of a smaller try-net door incorporating certain of the principles of this invention, but lacking the hinge connection between the two door panels.

In general, the door of this invention includes two sections or panels meeting along a fore and aft line, and disposed in use in relative obtuse-angled disposition. In the try-net door this disposition may be permanent, whereas in the door for the main trawl net, it is preferred that the two panels of the door be hingedly connected, so that when stowed the two panels may lie in coplanar disposition, but in use will be disposed at the obtuse angle referred to. In the latter case, means are provided to limit the relative movement of the parts from the monoplanar to the obtuse-angled disposition.

A towing bridle consists of two shorter forward lines and two longer after lines, all joined at a common point, where the towing line is secured, and with their points of anchorage upon the door located at such leverage points, as will be explained in detail hereinafter, that the water reaction forces, in conjunction with these leverages, must inevitably cause the door to assume the obtuse-angled disposition, and to veer off outboard and never inboard. Moreover, the points of anchorage of the trawl lines, the upper cork line and the lower ground line, which run to the net are at such leverage points, with relation to the points of anchorage of the towing bridle, that they too assist in assuring that the water reaction forces and the towing forces will bring the two panels of the door into proper disposition, and will position the door as a whole so that the water reaction forces will inevitably cause it to veer outboard. This phase of the invention, concerning the points of anchorage of the various lines, is not dependent upon making the door of two hingedly connected panels, but is equally applicable to the fixedly angled door for the try-net.

In the matter which follows, reference will be made to lines, eyes, and the like by reference numerals which are followed by a letter suffix, or alternatively by the numeral alone. The letter-suffixed numeral will be used whenever it is necessary to distinguish between two such lines or eyes, but if such distinction is unnecessary, and it is only necessary to refer to them generally or collectively, the suffix will be dropped, and the simple numeral will be understood to mean either one or both of the elements which, in the drawings, is shown only with a suffix.

The stern portion only of the trawling vessel V is shown in the drawings. Towing lines T extend aft behind the vessel V for connection to the opposite doors through the intermediate towing bridles. The trawl net, of more or less conventional form and shape, cannot be illustrated in the drawings for want of room, but the separated wings W are shown in Figures 1 and 2. The cork line C and the ground line G constitute the two trawl lines for each wing, and connect respectively to the upper and the lower edges of the net. A door such as the present invention is particularly concerned with is connected at the end of each tow line T, and to it connect the trawl lines C and G, and also the line L which is called a "lazy line," but which functions only during hauling of the net, not during trawling. The function of the door, as is clear, is to urge the wings W apart as far as is feasible in order to sweep a wide path along the bottom B.

The trawl door for the main trawl net, shown in Figures 3 to 6, inclusive, and illustrated also in use in Figures 1 and 2, comprises an upper panel 1a and a lower panel 1b of generally similar shape and size, elongated, and meeting along a common fore and aft line. There they are joined by hinge means 2 so that they may lie in the coplanar disposition best shown in Figure 4, or may move hingedly with respect to one another into the obtuse-angled disposition best shown in Figure 6. Relatively telescoping tubular elements 3 and 4 and stop shoulders 5a and 5b serve to limit the movement of the parts into the angular disposition, that shown in Figure 6, wherein they have an exterior angled face and an interior angled face. The panels, incidentally, may be made of any suitable material, wood or metal, but desirably the lower panel 1b would be provided at its lower edge with a weight 6, which would tend to sink when the door is dropped into the water, and so to dispose the door in an upright position, and heavy enough to draw the door to the bottom. The ends of the door, particularly its forward end, are rounded off so that the door will have no corner such as would tend to snag on the bottom. Its edges would be protected, as by metal banding illustrated at 13.

The towing bridle consists of two shorter lines 7, or to distinguish them, designated 7a and 7b, which are connected to the forward end of the door and to the respective panels 1a and 1b, and two longer lines 8, which again to distinguish them may be designated 8a and 8b, which are connected near the after end of the door and similarly to the respective panels 1a and 1b. These four lines converge and meet in a common point at 9, which is located outwardly of the exterior angled face of the door, and because of the difference in length of the lines 7 and 8 is located also nearer the forward end of the door. At this point 9 the tow line T is connected.

The lines 7 are anchored to the door panels at anchorage points indicated by the eyes 10, or again to distinguish them termed 10a and 10b, and these line anchorage points are located nearer the hinge line defined by the hinges 2 than to the outer longitudinal edges of the respective panels. The points of anchorage of the lines 8 to the door panels are similarly positioned, being represented by the eyes 11, or to distinguish them 11a and 11b. These are located near the after end of the door, but like the eyes 10a and 10b are located nearer the hinge line than the outer edges, that is the top and bottom edges, of the door. The greater outboard leverage, when this face of the door is subjected to water reaction forces, tilts the panels rearwardly about a line passing through the eyes 10a and 11a, 10b and 11b, and results in hinging the panels about the hinge 2, in effect.

The location of the points of connection of the trawl lines C and G with respect to the points of connection of the towing bridle is important. With the trawl lines anchored to the door at eyes 12, located farther from the hinge 2 than the eyes 10 and 11, the rearward pull of the net at 12 tends to rotate each panel 1a and 1b about a line passing through 10 and 11, and thus assists the water reaction forces previously discussed in hinging the door into its angled position of usage. In addition, the location of the anchorage point of a given panel at 12, so that the rearward drag of the trawl lines C and G is on longitudinal lines which, if extended forwardly, lie intermediate the anchorage points 10 and 11 of each panel, or nearer the forward eyes 10 (see Figure 5), produces a powerful leverage in the longitudinal direction which pulls the forward end of the door outboard about the after eyes 11. This is to be distinguished from present practice wherein the trawl lines constitute actually, or in effect, direct rearward extensions of the after bridle lines 8. A forward projection in space of the trawl line C, as shown in Figure 1, lies nearer the forward eyes 10, and is offset materially outboard from alignment with the after eyes 11. Such relative disposition of the lines, producing the leverage just discussed, becomes more pronounced with the hinging of the door panels into their angled position, and that hinging is in effect an immediate and automatic effect of dropping the door and subjecting it to opposed pulls and to water reaction forces.

Such a door is let overboard from its stowed position alongside the stanchion S, and because of the weighted edge at 6 and the effects of the leverages and water reaction forces referred to above, tends to come to an upright disposition in the water as it sinks. The water reaction forces on the angled panels, slantingly disposed relative to the direction of advance, holds it in such disposition. Pull on the taut tow line T tends to equalize the pull on the towing bridle lines 7, 8. There is, of course, the natural disposition of these lines of unequal length to incline the door, having the weighted edge 6 lowermost, with its forward end outboard and its aft end inboard of the direction of movement, but, in addition, because of the location of the points of securement 10a, 10b, 11a and 11b, nearer the hinge line than the outer edges of the respective door panels, and the location of the eyes 12 farther from the hinge line, there is a greater outboard moment arm which urges the respective panels to swing around a line passing through the after anchorage points 11a and 11b, and forces so generated, plus water reaction forces, will urge the door as a whole into the obtuse-angled relationship shown in Figures 5 and 6, with its forward end outboard. Moreover, since the trawl lines C and G are also taut, they, too, will pull on the door, and in addition to tending to hinge the panels backwardly along the hinge line at 2, the forces generated by the pull on the trawl lines at the points of anchorage 12 produce further longitudinal moments acting outwardly of the points of anchorage at 11, which tend to urge the forward end of the door outboard. The combined action of all these forces is to insure that the door moves promptly into the obtuse-angled disposition, with its forward end directed outboard, whereby the obtuse-angled door tends to move evenly outboard, and that it remains in this disposition until it reaches and while it rides along the bottom B.

Its lower panel 1b being angled as it rides along the bototm, the slope thereof with relation to the bottom's surface acts as a skid rather than as a plow, and it is primarily this which prevents the door from "mudding in," and which causes it, instead, to ride up and over the bottom surface. Its obtuse-angled shape also holds it more steady than if it were flat, and avoids its dodging from side to side.

The try-net door shown in Figure 7 is of much the same general nature, although since it is much smaller and lighter its panels need not be hingedly connected. As shown, it includes an upper panel 21a and a lower weighted panel 21b which are joined permanently in an obtuse-angled relationship. Here again the points of anchorage at 20a, corresponding to the eyes 10a, and at 20b corresponding to the eyes 10b, are located at the obtuse-angled face of the door, but both upon the upright panel 21a rather than one on that panel and one on the other panel 21b. Similarly, the points of anchorage 23a and 23b correspond to the eyes 11a and 11b. At the opposite interiorly angled face of the door are located the points of anchorage 22, corresponding to the eyes 12. Because the door is rather thin, the physical location of the eyes 22 is ahead of the eyes 23, and thus achieves the same result, a towing force at a moment arm about the eyes 23 overcoming an opposite force at the moment arm about the eyes 22.

It will be seen that this door will tend to remain upright with its lower panel 21b angled with relation to the bottom, so that it will not dig in but will slide over the same, and it will be seen that the several points of anchorage of the various lines are connected in such a way as to produce the moment arms referred to in the description of the main door of the other figures.

An eye 14 is shown near the after end of the main door, and this is for the securement of the end of the lazy line L which, as has been indicated, does not function during the trawling operation, but only during the hauling operation.

I claim as my invention:

1. A trawl door of the kind described, comprising an upper panel and a lower panel which, in use, lie in obtuse-angled relationship along a common fore and aft line, a towing bridle for said door comprising tension elements diverging forwardly and rearwardly, and upwardly and downwardly, from a point spaced from the exterior-angled face of the door, and located ahead of the door's longitudinal midpoint, and anchorage means for the several tension elements disposed upon the respective panels at the exterior-angled face of the door, in position to engage the end of each such divergent tension element, the tension elements which diverge rearwardly being longer in length than such as diverge forwardly, and means at the common apex of said tension elements for securement of a towing line.

2. A trawl door and a towing bridle therefor as in claim 1, including trawl line means extending rearwardly from the door for connection to the net, and anchorage means upon the interiorly angled face of the door for said trawl line means, located exteriorly of the pattern defined, at the exteriorly angled face of the door, by the bridle anchorage means.

3. A trawl door of the kind described, comprising a planar upper panel and a planar lower panel which, in use, lie in obtuse-angled relationship along a straight common fore and aft line, a towing bridle for said door comprising two shorter lines diverging forwardly and respectively upwardly and downwardly from a point spaced from the exteriorly angled face of the door, and located ahead of the door's longitudinal midpoint, and two longer lines diverging rearwardly and respectively upwardly and downwardly from the same point, and four anchorage means for the respective bridle lines disposed upon the exteriorly angled face of the door, two of said anchorage means being disposed adjacent the door's forward end for engagement with the said shorter lines, and the other two of said anchorage means being disposed adjacent the door's after end, for engagement with the said longer lines.

4. A trawl door of the kind described in claim 3, wherein the shorter lines are of like length, and the longer lines are of like length, and wherein a forward anchorage means and an aft anchorage means are located upon each panel, equidistant from the fore and aft line common to the two panels, and the respective towing bridle lines are each connected to the corresponding anchorage means, whereby the towing bridle is rigged to maintain the two panels, in use, both inclined rearwardly from such common fore and aft line.

5. A trawl door as described in claim 3 including hinge means connecting the said upper and lower panels along the said fore and aft line for relative movement of said panels about said line between a coplanar disposition and an obtuse-angled disposition, and means to limit said movement, in use, to the said obtuse-angled disposition of said panels.

6. A trawl door as in claim 5, wherein a forward anchorage means and an aft anchorage means is mounted upon each of the upper and lower panels, at points located nearer the hinge line than the outer longitudinal edges of the respective panels.

7. A trawl door and a towing bridle therefor as in claim 6, including an upper and a lower trawl line extending rearwardly from the door, and an anchorage means upon each panel for the respective trawl lines, each located at the interiorly angled face of the door in the vicinity of the respective anchorage means for the after bridle lines, but nearer the respective outer longitudinal edges of such panels.

8. A trawl door and a towing bridle therefor as in claim 7, characterized in that the line of drag through the trawl line anchorage means, in use, when extended forwardly lies farther from the hinge line than the anchorage means for the two after towing bridle lines.

9. A trawl door as in claim 3, and two anchorage means for the upper and lower trawl lines mounted at the interiorly angled face of the door, located in the vicinity of the respective anchorage means for the rear bridle lines, and behind but outwardly of the locations of the latter anchorage means.

10. A trawl door comprising elongated upper and lower panels of substantially similar area and shape, hinge means joining said panels along a common fore and aft line, means limiting their relative hinging movement from a generally coplanar disposition for storage into an obtuse-angled disposition during use, four line-anchorage means, two carried by each panel at the door's face which, in the obtuse-angled position of use, is exteriorly-angled at points which are adjacent the panel's fore end and its aft end, respectively, and located nearer the hinge line than the outer edge of the respective panels, and a towing bridle comprising four lines diverging from a common point located outwardly beyond the exterior-angled face of the door and ahead of the door's fore and aft midpoint, and extending thence to the four line anchorage means.

11. A trawl door and towing bridle as defined in claim 10, including two additional line-anchorage means secured to that face of the door which, in the obtuse-angled position of use, is interior-angled, one being secured to one panel adjacent the after line-anchorage means at the opposite face of that panel, in a position wherein the line of drag of a line attached to and extending rearwardly from said additional line-anchorage means, if extended forwardly, lies outwardly of said after line anchorage means, and the other additional line anchorage means being secured to the other panel in similar disposition, for the anchorage of trawl lines leading forwardly from the wings of a trawl net.

References Cited in the file of this patent

UNITED STATES PATENTS

| | | |
|---|---|---|
| 2,504,091 | Scheel | Apr. 11, 1950 |

FOREIGN PATENTS

| | | |
|---|---|---|
| 11,607 | Norway | May 16, 1902 |
| 819,018 | Germany | Oct. 29, 1951 |